United States Patent [19]
Weiss

[11] Patent Number: 5,237,614
[45] Date of Patent: Aug. 17, 1993

[54] INTEGRATED NETWORK SECURITY SYSTEM

[75] Inventor: Kenneth P. Weiss, Newton, Mass.

[73] Assignee: Security Dynamics Technologies, Inc., Cambridge, Mass.

[21] Appl. No.: 712,186

[22] Filed: Jun. 7, 1991

[51] Int. Cl.$^5$ .............................................. H04K 9/00
[52] U.S. Cl. ........................................ 380/23; 380/25
[58] Field of Search .............................. 380/4, 23–25, 380/46; 340/825.31, 825.34; 395/725

[56] References Cited

U.S. PATENT DOCUMENTS

| | | | |
|---|---|---|---|
| 3,764,742 | 10/1973 | Abbott et al. | 178/22 |
| 3,806,874 | 4/1974 | Ehrat | 340/149 |
| 3,886,451 | 5/1975 | Chu et al. | 324/186 |
| 3,900,867 | 8/1975 | Wagner | 343/6.5 |
| 3,995,111 | 11/1976 | Tsuji et al. | 178/69.5 |
| 4,104,694 | 8/1978 | Hargrove | 361/172 |
| 4,126,761 | 11/1978 | Graupe et al. | 179/1.5 |
| 4,145,568 | 3/1979 | Ehrat | 178/22 |
| 4,145,569 | 3/1979 | Ehrat | 178/22 |
| 4,185,166 | 1/1980 | Kinch, Jr. et al. | 178/22 |
| 4,193,073 | 3/1980 | Kohnen | 343/6 |
| 4,277,837 | 7/1981 | Stuckert | 364/900 |
| 4,295,039 | 10/1981 | Stuckert | 235/380 |
| 4,302,281 | 11/1981 | Bouricius et al. | 364/200 |
| 4,320,387 | 3/1982 | Powell | 340/825.34 |
| 4,326,098 | 4/1982 | Bouricius et al. | 178/22.08 |
| 4,471,216 | 9/1984 | Herve | 235/380 |
| 4,494,211 | 1/1985 | Schwartz | 364/571 |
| 4,509,093 | 4/1985 | Stellberger | 361/172 |
| 4,536,647 | 8/1985 | Atalla et al. | 235/379 |
| 4,543,657 | 9/1985 | Wilkinson | 375/1 |
| 4,578,530 | 3/1986 | Zeidler | 178/22.09 |
| 4,582,434 | 4/1986 | Plangger et al. | 368/46 |
| 4,589,066 | 5/1986 | Lam et al. | 364/200 |
| 4,599,489 | 7/1986 | Cargile | 178/22.08 |

(List continued on next page.)

FOREIGN PATENT DOCUMENTS

0010496  4/1980  European Pat. Off. .
0140013  5/1985  European Pat. Off. .

OTHER PUBLICATIONS

I.B.M. Tech. Disc. Bull., vol. 26, No. 7A, Dec. 1983, p. 3293.
I.B.M. Tech. Disc. Bull., vol. 26, No. 7A, Dec. 1983, pp. 3286–3288.
Information Week, Oct. 7, 1985, pp. 25–27.
Sytek Product Literature.
Racal Guardata Product Literature.
IBM Tech. Disclosure Bull. 31 (1989) Jan. No. 8, pp. 195–198 Method for Managing Client/Server Relationships in the AIX Operating System.

*Primary Examiner*—Salvatore Cangialosi
*Attorney, Agent, or Firm*—Wolf, Greenfield & Sacks

[57] ABSTRACT

An integrated network security system is provided which permits log-on to a normally locked client on the network in response to at least one coded non-public input to the client by a user. At least a selected portion of the coded input is encrypted and sent to a network server where the user is authenticated. After authentication, the server preferably returns a decryption key, an encryption key for future use and any critical files previously stored at the server to the client. The decryption key is utilized to decrypt any material at the client which were encrypted when the client was locked, including any material sent from the server, thereby unlocking the client. The decryption key may be combined with untransmitted portions of the original coded input in a variety of ways to generate an encryption key for the next time the terminal is to be locked. When one of a variety of client locking conditions occurs, the previously generated encryption key is utilized to encrypt at least selected critical material at the client. Critical directories or the like in encrypted form may be sent to the server and a message is sent to the server that the client is locked, which message is utilized by the server to inhibit the client from further access to at least selected resources on the network.

52 Claims, 3 Drawing Sheets

U.S. PATENT DOCUMENTS

| | | | |
|---|---|---|---|
| 4,609,777 | 9/1986 | Cargile | 178/22.08 |
| 4,636,583 | 1/1987 | Bidell et al. | 178/22.17 |
| 4,641,322 | 2/1987 | Hasegawa | 375/1 |
| 4,677,617 | 6/1987 | O'Connor et al. | 370/100 |
| 4,720,860 | 1/1988 | Weiss | 380/23 |
| 4,731,841 | 3/1988 | Rosen et al. | 380/23 |
| 4,802,216 | 1/1989 | Irwin et al. | 380/23 |
| 4,819,267 | 4/1989 | Cargile et al. | 380/23 |
| 4,849,613 | 7/1989 | Eisele | 235/379 |
| 4,856,062 | 8/1989 | Weiss | 380/23 |
| 4,885,778 | 12/1989 | Weiss | 380/48 |
| 4,890,323 | 12/1989 | Beker et al. | 380/25 |
| 4,944,008 | 7/1990 | Piosenka et al. | 380/23 |
| 4,998,279 | 3/1991 | Weiss | 380/23 |
| 5,023,907 | 6/1991 | Johnson et al. | 380/4 |
| 5,023,908 | 6/1991 | Weiss | 380/23 |
| 5,046,125 | 9/1991 | Takizawa | 380/23 |
| 5,077,792 | 12/1991 | Herring | 380/24 |

INTEGRATED NETWORK SECURITY SYSTEM

FIELD OF THE INVENTION

This invention relates to a computer security system and more particularly to a system for assuring secure access both to a computer network and to each individual client computer on the network.

BACKGROUND OF THE INVENTION

As the use of local area networks (LAN's) and other computer networks proliferate, the problems of providing adequate security for the various resources available on the network become increasingly important. Such security includes protection against unauthorized use of the network by both individuals internal to an organization and those outside the organization, as well as preventing unauthorized use of various network resources by individuals granted only limited access to the network and/or to selected resources thereon. Thus, an individual may have the right to obtain information from one server on a network, but not from another server, or may be granted access to selected classes of information at a given server, for example, engineering data, but not other classes of data, for example, personnel records.

While various network security systems are available, they have suffered from a variety of limitations. The simpler systems provide security, generally by use of a numeric or alphanumeric personal identification number or code (PIN), to an individual machine or other resource on the system. An alphanumeric PIN (AN PIN) is sometimes also referred to as a password. In some instances, such PIN is passed in clear text over the network, making it vulnerable to unauthorized detection and misappropriation. Such systems also store the PIN at a user or client machine on the network (hereinafter client), meaning that someone misappropriating the client also gains access to the PIN, and thus access to the network. Such systems also frequently transmit sensitive data over the network in clear text form, making such data susceptible to unauthorized interception.

While more sophisticated systems exist which encrypt PINs for transmission and possibly for storage, and which also permit at least a selective encryption of data being transmitted on the line, such systems are frequently complicated to use. Even sophisticated systems such as the Kerberos authentication system developed at MIT, while normally requiring only a single log-on by a user, involve substantial amounts of data processing for all transactions, and basically require a server dedicated to the security function; and even sophisticated systems such as Kerberos are vulnerable if an intruder can successfully obtain a legitimate user's log in name and PIN.

Thus, a need exists for an improved integrated network security system which, while being easy to use, requiring only a single log-in by the user, while providing security utilizing at least two security factors. The three security factors generally utilized are something the user has (i.e. a card or token), something the user knows (i.e. a PIN) and something the user is (i.e. voice recognition, fingerprint, etc). The first two are the factors most commonly utilized. The system should also provide complete security for any numeric or alphanumeric PIN used. Such security should preferably prevent the detection of the PIN through decryption of an encrypted PIN surreptitiously intercepted on the network. Similarly, a PIN, even in encrypted form, should not be stored at a client when a client has been discourteously disconnected (removed from the network in an unauthorized fashion) or when the client is not in use. Such systems should also provide the capability of assuring that the client is not usable in any way, either itself or to access any resource on the network, when the client is to be locked (i.e. before a proper log on procedure has been completed and after a log off has occurred, while affording a capability of permitting limited use of the client at such time at the option of a network administrator.

All transmissions of sensitive information over the network should also be in encrypted form and access to various resources on the network, including servers and other clients, should be prevented until a proper log on has been completed at the client and should be fully controllable thereafter.

SUMMARY OF THE INVENTION

In accordance with the above, this invention provides an integrated security system for a network which has at least one server and at least one client. Each client is normally locked so that the client cannot be used except to be logged onto, or can only be used for selected limited functions, and so that the client cannot be used to gain access to the network. Log on is accomplished by the user providing at least one coded input to the client. The coded input from the user may include a numeric or alphanumeric PIN and should also include a non-predictable number, preferably a time varying or other dynamically changing non-predictable number, generated by a device in the possession of the user. The code entered by the user may also be a coded response obtained from the server in response to an initial query provided by the user.

The codes inputted by the user are preferably encoded or encrypted, for example, by combining various elements of the coded input in a predetermined way. To assure that the user PIN cannot be determined in any way from transmitted information, it is preferable that only a portion of such input, encoded as indicated above, be transmitted to the server for authentication. The remainder of the coded input may be discarded, but is preferably saved to be used in a manner to be described later.

The transmitted representation of the coded input is utilized at the server, which server is maintained at a high security facility, to authenticate the user logging on at the client. Where only a single user has access to the client, this may be accomplished by utilizing the client ID to retrieve the user code appropriate at the current time in encrypted form and performing a comparison of the received and retrieved encrypted coded representations. Preferably, authentication is accomplished by retrieving the appropriate code in decrypted form and decrypting the received coded representation before performing the comparison. Where there are two or more users permitted at a given client, the current codes available for all such users are retrieved and compared in suitable form against the received input to both identify and authenticate the user.

Either before or after authentication, appropriate unlock inputs for the client are retrieved at the server and, after authentication, these unlock inputs are transmitted to the client. For some embodiments of the invention, at least selected files and directories required for the use of the client are encrypted when locking occurs, the unlock inputs being a decryption code or key for such material which may be utilized at the client. It is also possible for critical directories or other material to be transmitted in encrypted form or otherwise securely transmitted and stored at the server when a client is locked and for such critical material to be retransmitted to the client after authentication. Since the decryption key is used immediately and is of no value after use, it may be sent in unencrypted form if desired or may be encrypted. For preferred embodiments, a full or partial encryption key to be used the next time the client is to be locked is also transmitted in encrypted form after authentication.

Locking of a client may occur in response to selected conditions such as a discourteous disconnect or other prohibited activity by the user at the client, an end of session input from the user, a log-off signal from the server, or a selected period of time passing since the last use of the client by the user. When a client is to be locked, the encryption code previously transmitted from the server is utilized to encrypt at least selected directories and/or files at the client and any representation of the original coded input from the user is zeroized (i.e., erased, written over with zeros, discarded, or otherwise permanently obliterated). Preferably, before being zeroized, a portion of the coded input from the user which was previously saved is combined with the encryption key from the server to form the encryption key used at the client. This assures that the encryption used at the client never appears in any form in its entirety on a network line. If desired, to secure a longer encryption key, the device employed by the user to produce the non-predictable code may have a means thereon which causes a second dynamic non-predictable code to also be produced, which second code may be inputted into the client and saved. This second non predictable code may be added to or otherwise combined with the previously described encryption key to form a longer and thus much more secure encryption key for the client. Alternatively, some or all of the coded factors used to generate the encryption key may be combined in a one-way function with non-secret factors such as the client serial number, time of day or the like to obtain the longer encryption code. To even further enhance security at the client, when the client is to be locked, selected directories or other critical material at the client may be transmitted in encrypted form to the server, zeroized at the client and stored at the server until the next time there is an authentication of a user at the server. Network security may also be enhanced by utilizing at least a portion of the stored encryption code to encrypt at least selected transmissions over the network to and from the client (i.e. end-to-end encryption).

It is also possible for the server, under control, for example, of a network administrator, to store a release code at the server and/or at the client to inhibit the full locking of the client in response to the occurrence of a selected condition which would normally cause locking. For example, a release code may permit continued use of the client, but lock the client from access to the network. Other possibilities include permitting only restricted use of the client, for example, not permitting access by the client to selected directories or files which may be encrypted, and/or permitting selected access by the client to various resources on the network while inhibiting access to other resources.

Where the client may receive selected protected files from the server, or may itself generate files having a protected status, a protection flag may be included with such files, and a suitable means may be provided in response to the detection of a protection flag for preventing use of the protected file at the client after a selected locking condition has occurred. Use of the file may be inhibited by reducing or eliminating the release code for the client, but is preferably accomplished by assuring that such file is at least encrypted, and preferably erased or zeroized, when a locking condition occurs. Where such a file to be zeroized is a file which may be written into by the client, the file is encrypted and transmitted to the server for storage before being zeroized.

The foregoing and other objects, features and advantages of the invention will be apparent from the following more particular description of a preferred embodiment of the invention as illustrated in the accompanying drawings.

DETAILED DESCRIPTION

Figure 1:
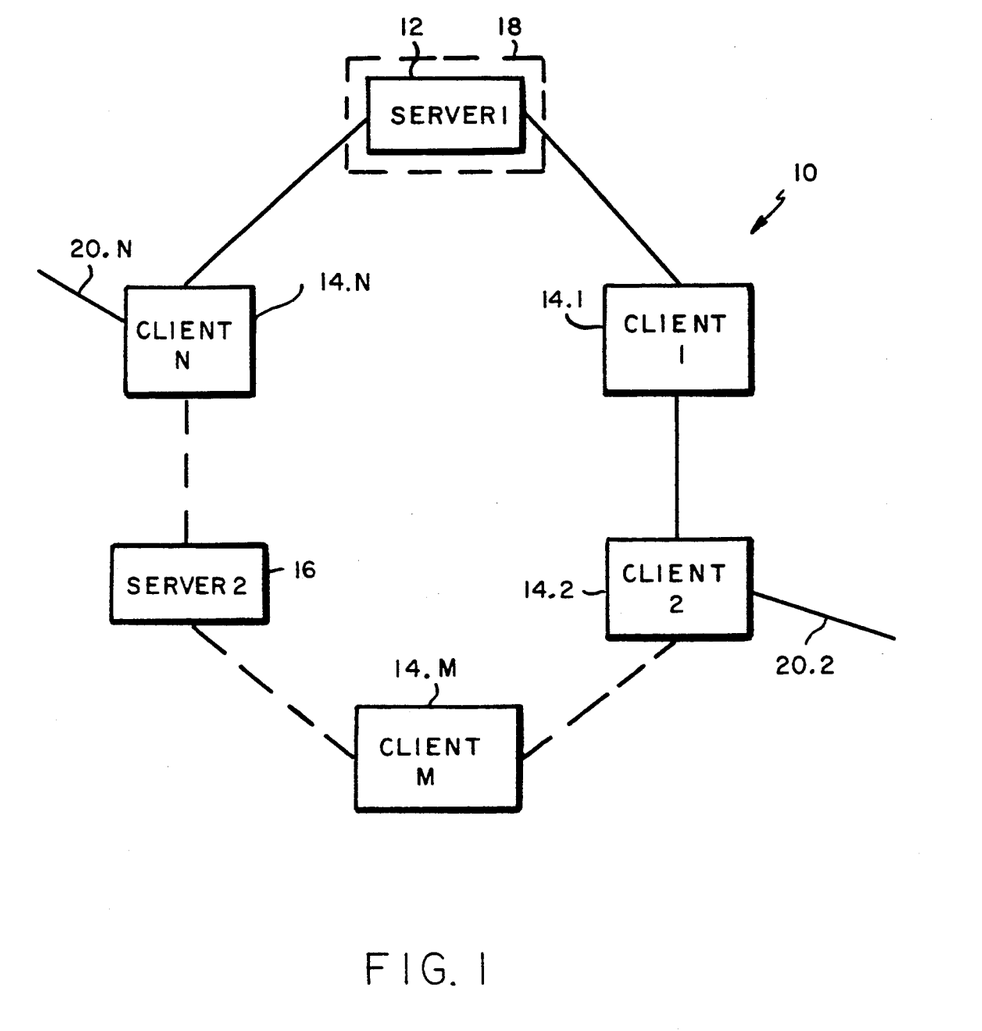
FIG. 1 is a block diagram of an exemplary network in which the teachings of this invention may be utilized.

FIG. 1 is a block diagram of an examplary network 10 in which the teachings of this invention might be utilized. The network includes a main or control server 12 which is utilized in providing network security, a plurality of clients 14.1-14.N and at least one additional server 16. Servers 12 and 16 are computers adapted for performing the server function and include a processor for running appropriate programs for performing the server function as well as appropriate file storage and other appropriate hardware. Each client 14 might be a personal computer (PC), work station, or other computer typically found on a network. A client may also be a remote lap top or other computer connected to the network through modems. As indicated by dotted box 18, server 12 is located at a secure location so that physical access to server 12 cannot be obtained except by authorized personnel such as a network administrator. As illustrated for client 2 and client N, each client, in addition to being on network 10, may also be connected by a suitable line 20 to additional systems or networks.

In operation, each client 14 may obtain files or other information or material from a server 12 or 16 or from other clients 14 and may access a server or client on the network for other services available on the network. For purposes of the current discussion, it will be assumed that a standard technique is utilized for controlling communications on the network. One such technique would be for all requests for services to be routed to server 12 which first assures that the request is authorized for the client and/or user and then either provides required files or other resources or routes the request to the appropriate server 16 or client 14 for the requested resource. In such a system, the server would maintain an audit trail of all transactions on the network. In other networks, each request for a resource includes an address or tag causing the request to be routed to the appropriate resource on the network. The exact manner in which such network routing is accomplished does not form part of the present invention.

As previously discussed, one problem with networks such as the network 10 shown in FIG. 1 is that an unauthorized user at a client 14 may obtain access to sensitive system resources. It is also possible for an unauthorized individual, through the use of a modem, to gain access to the network. As previously indicated, current systems typically control access to the network primarily by controlling access to each client by use of appropriate log-on procedures, typically involving some type of log-in name accompanied by a numeric or alphanumeric PIN. Such systems are easily compromised by an intruder gaining access to a user log-in and PIN by surreptitiously listening in on the network or by other means. Hackers and other unauthorized users are also becoming increasingly sophisticated at breaking into such networks.

More sophisticated systems involve more complicated procedures, including systems such as the Kerberos system which requires a server virtually dedicated to performing the security function. However, the complexity of such systems slow down operations on the network and may require a substantial amount of software both at the authentication server and at the various clients and servers on the network.

In accordance with the teachings of this invention, security for the system is controlled at log-on and at log-off for each client 14 with selected software or computer programming being located at server 12 and selected software being located at each client 14. Once a user has logged onto the system at a given client 14, and until the client is locked in a manner to be described later, the user has access to at least a selected portion of the resources on network 10 in accordance with standard network security procedures. For example, if all requests for service are routed through server 12, and, as will be indicated later, the server knows the user located at each client 14, the server, in accordance with security procedures programmed into the server by a network administrator, can control resources made available to a given user/client. For example, if a given user does not have clearance to receive personnel records, this fact would be recorded in an appropriate field of an entry for a given user/client at the server, and any request from the client for personnel records would be denied. The mechanism for accomplishing this does not form part of the present invention.

Figure 2:
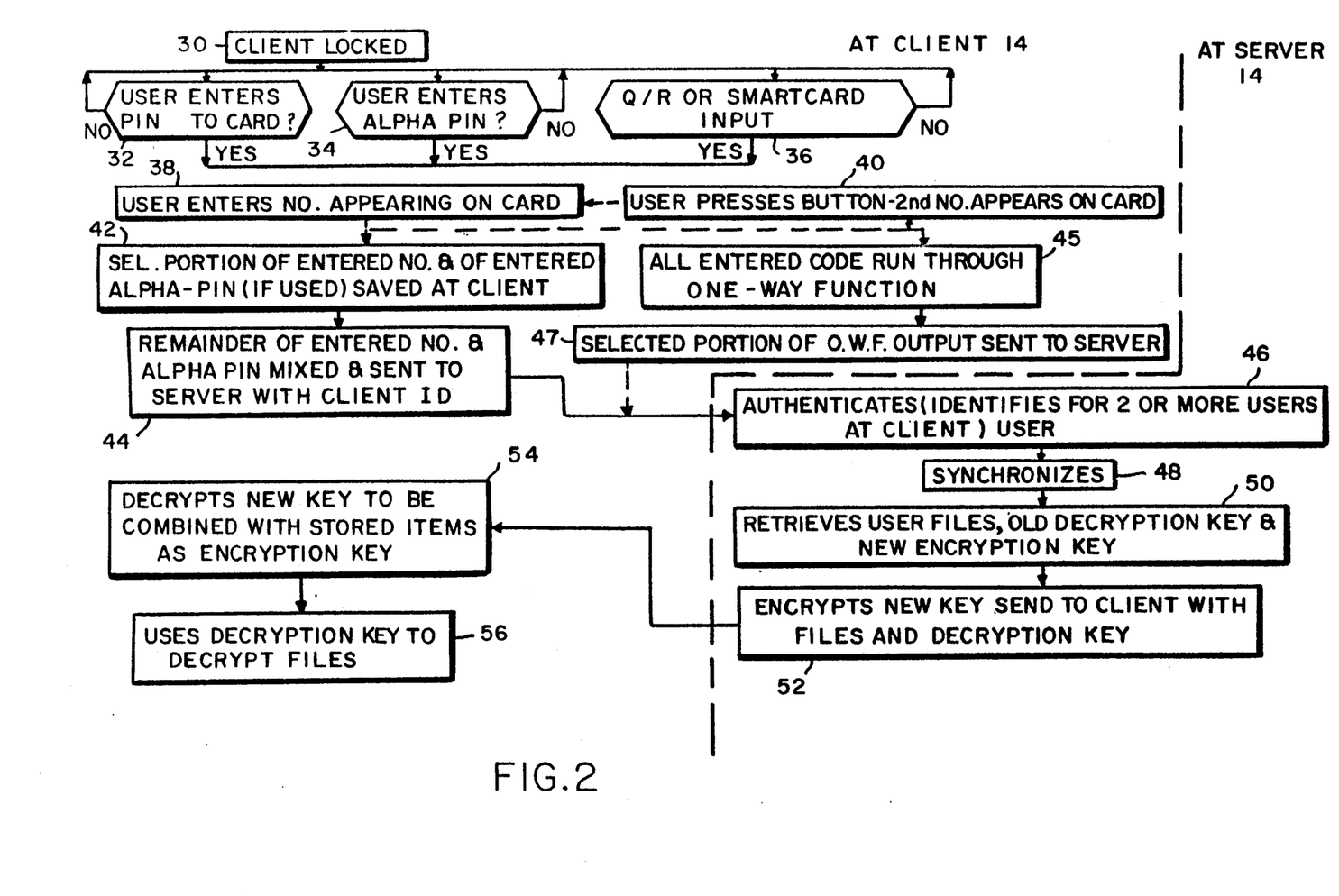
FIG. 2 is a flow diagram of the steps performed at a client and at the server when a client is to be unlocked.

Referring to FIG. 2, a flow diagram is provided of the procedure in accordance with the teachings of this invention for logging on at a given client 14. It is assumed that the client is initially locked as indicated by block 30. When the client is locked, the client is normally not permitted access to network 10. For the preferred embodiment, a user is also unable to use the client 14 when it is locked for anything other than logging onto the system. However, it is possible for the system to be utilized for performing other limited functions when locked, which functions normally do not involve access to critical or secure files.

In order to unlock the system, it is necessary that a user authorized to use the client log onto the client utilizing a selected log-on procedure. FIG. 2 illustrates several possible log-on procedures; however, the invention is not to be construed as being limited to the use of such procedures.

In particular, log-on procedures 32, 34 and 36 are shown. With log-on procedure 32, the user is provided with a device such as that disclosed in U.S. Pat. No. 5,023,908 which is to issue on Jun. 11, 1991 in the name of Kenneth W. Weiss. This device, which preferably is in the general shape of a credit card, contains circuitry for generating a time varying non-predictable number which is unique to the user. The number may, for example, change every minute. The card may alternatively be utilized to generate other dynamically varying non-predictable numbers. The card may also have pressure-sensitive areas or pads representing the various digits which may be utilized for entering a numeric PIN. With this log in procedure, the user enters his PIN on the pressure sensitive areas of the card. This PIN may then be combined, for example by addition without carry, with the non predictable number being generated by the device, the combined number being displayed. During step 38, the user would then enter the number appearing on the card, which number includes the user's numeric PIN in an encrypted form, into the client.

Instead of combining the PIN with the non-predictable code as described above, the user card could be programmed to recognize the user PIN, for example, by a match operation. If the device determines that a wrong PIN has been entered, it either produces no number or produces an incorrect number which will not be accepted by the server. In order to protect the PIN, the PIN is stored on the card after being run through a one way function, and the inputted PIN is run through the same function before comparison.

The limitation of the procedure described above is that it results in a relatively small number of code bits for later encryption use. Therefore, to obtain a larger number of code bits, log-on may be accomplished in accordance with step 34 by entering an alphanumeric PIN directly into the client, either before or after performing step 38. The larger number of bits results from the fact that an alphanumeric character has more bits than a numeric character. With this procedure, the number entered during step 38 would normally be just the non-predictable number generated by the device and not this number combined with a user numeric PIN. However, there is no reason why step 32 could not be performed in conjunction with step 34.

A third standard technique for logging onto a system is by use of a query/response, a one-time pad or a smart card. These techniques are lumped together since they differ primarily only in that with standard query/response, the user enters a response received from the server into the device and, after manipulation (i.e. encryption), the resulting number on the device is manually entered, while with the smart card, entry of the response is automatically performed. A one time pad has a cache of encoded numbers which are used for successive log-ons in a predetermined sequence. With either method, the user initially enters a value into the system which is typically a non confidential log-on identifier. The server then sends a response which is normally combined with a user PIN input, either numeric or alphanumeric, and returned to the server. Without a smart card, the user must also input the response. Where step 38 is performed, the user also inputs the number appearing on his card, which number, if step 32 is performed, may be combined with the PIN rather than combining the PIN with the server response.

While a variety of log-on procedures have been illustrated in FIG. 2, it is apparent that all of these procedures would not normally be utilized in a single system, although as discussed above, it might in some situations be desirable to combine step 32 with one of the other log-in procedures. As indicated above, log in procedures other than those discussed above might also be utilized.

Step 40 illustrates another optional step which may be performed during log-in to produce a larger number for subsequent encryption. In particular, the user device may contain a pressure-sensitive area which, when pressed by the user, causes a second non-predictable number to be displayed. This number may be generated using a different algorithm than that for the number displayed, but is preferably, in order to simplify the card circuitry, the next number which would normally be generated. As will be discussed later, this additional number may be stored at the client and utilized at log-off for encryption purposes to provide a longer and thus more secure encryption key.

Once a log-in code has been entered at client 14, regardless of the form in which this code is entered, the operation proceeds to step 42. During step 42, a portion of the code which was inputted into client 14 is saved at the client. During step 44, the next-step in the operation, another portion of the code which was inputted, preferably the remaining portion, is encrypted in a selected way and transmitted to the server. For purposes of the following discussion, it will be assumed that only steps 34 and 38 were performed during log-on so that the code inputted to the client is, for example, a six character alphanumeric code from step 34 and an eight character numeric code from step 38. Some portion of each of these codes, for example, the least significant characters, most significant characters, or alternate characters from each code, are then stored at an appropriate location in client 14 during step 42. Selected characters which are not stored, and preferably the remaining characters which were not stored during step 42, are then combined in a preselected way (for example, by addition without carry) or otherwise encrypted during step 44 and sent to server 12 along with an ID for the client, which ID may be sent in clear text. This procedure has the advantage that not only is no portion of the user's PIN or of the non-predictable code generated by the user device transmitted in clear text on a network line, but a substantial portion of this information is missing when transmitted on the line so that, even if the transmitted material were intercepted and sophisticated deencryption techniques were utilized thereon, it would still not be possible to reconstruct the user PIN since data for a substantial portion of this PIN is missing from the transmission.

However, while for the reason indicated, the saving and transmission of different portions of the code is preferred, this is not a limitation on the invention. Thus, all of the inputted code could, if desired, be encrypted and transmitted to the server, with some of such code also being saved, or no code being saved. Other combinations of saving code portions and transmitting code portions are also within the contemplation of the invention.

One problem with the technique described above where only a portion of the code inputted by the user is transmitted to the server arises from the fact that the portion of such code which is saved at the client may, as will be discussed in greater detail later, be utilized as part of or in generating the subsequent encryption key used at the client when the client is to be locked. The next time the client is to be unlocked, the server is able to send the proper complete decryption key because the server knows what the untransmitted portion of the user's code should have been. However, if the user properly enters the transmitted portion of his code, but makes an error in inputting the untransmitted portion, the server will authenticate the user, but on log-off when encryption occurs, it will be done using an improper encryption key which will then be erased, and there will be no way to reconstruct the improper encryption key to permit the client to be unlocked.

One way to avoid this problem is to run the entire inputted code from the user through a one-way function with either all or a selected portion of the output from such one-way function being transmitted to the server. Thus, even though all characters outputted from the one-way function are not transmitted, the characters transmitted serve as a check-sum to assure that the original coded input was correct, and thus to avoid the permanent lockout problem discussed above without requiring that all characters necessary to reconstruct the original coded input be transmitted. This alternate procedure is illustrated by box 45 in FIG. 2.

Another possibility, instead of step 40, to provide additional characters for subsequent encryption is to utilize all or a selected portion of the original coded input characters, as well as other non-secret static or dynamic information available to the client such as the serial number of the client, the time of day, the user's social security number, or the like as inputs to a one-way function, the output from which is a long encryption character sequence.

One advantage of having a large encryption character sequence is that part of this character sequence can be used for encrypting all or selected communications between the client and the server or other resources on network 10 (i.e. end-to-end encryption), while a remaining portion of the encryption code, which may include some but not all of the code used for the end-to-end encryption, is utilized for encrypting files, directories and other material at the client when the client is to be locked. Thus, full end-to-end encryption of communications in and out of the client is possible without there being any danger of the encrypted key utilized to encrypt client material when the client is locked being compromised by surreptitious interception on the network.

When server 12 receives the transmitted information, it utilizes the client ID to retrieve the code which is appropriate for the client at the given point in time. Where two or more users are authorized to use a given client, codes appropriate to both users are retrieved and the code received from the client is compared against the retrieved codes for all users authorized to use the client. With only a single user at a client, a match between a transmitted and a retrieved code is used to indicate authentication. Where there are two or more users, the code matched on is utilized both to identify the user at the client and to authenticate the user. Matching may be accomplished by storing and retrieving the coded information at the server in the same combined or encrypted form in which such coded information is transmitted, by storing the information in normal form and then combining or encrypting it before comparison or by deencrypting the received transmission from the client before doing the match. The procedures discussed above constitute step 46 of the operation.

Where a code inputted by the user is a time varying code, it is necessary that the clock at the device in the possession of the user be in synchronism with the clock at server 12. Step 48 is intended to achieve this objective and would normally be performed before matching is effected during step 46. A preferred way of performing synchronization is taught in U.S. Pat. No. 4,885,778, issued Dec. 15, 1989. Basically, this technique involves generating additional codes for time periods adjacent to the current time period, authenticating a user if the inputted code matches the generated codes for any of the adjacent time periods and utilizing the spacing between the code for the current time period and the code matched on to resynchronize the system. Other techniques known in the art for resynchronization might also be utilized.

Once authentication has occurred, the operation proceeds to step 50 during which any files for the client or user, for example, critical directories or tables, which were transmitted to the server in a manner to be described later in encrypted form the last time the client was locked are retrieved. The key or code which was used to encrypt files and directories remaining at the client is also retrieved as a decryption key and a new encryption key for the particular user/client is also generated and retrieved. During step 52, the new encryption key for the client is itself encrypted and sent to the client along with the files and the encryption key retrieved during step 50. The files are stored in the same encrypted form in which they were transmitted to the server and are thus still encrypted for retransmission. Since the decryption key is used immediately on being received at the client for decrypting information remaining thereat and is then no longer of any value, the decryption-key would not normally be encrypted, but may be encrypted for transmission to the client, if desired.

When the client receives the material transmitted during step 52, it performs steps 54 and 56 in a sequence which is not critical. During step 54, the new encryption key is decrypted and is combined with at least a portion of the code saved at the client during step 42 to form an encryption key to be used for encrypting critical files, directories and the like the next time the client is to be locked. If step 40 is performed, the material inputted and stored at the client as a result of this step being performed may also be included as part of the new encryption key to increase the encryption length and thus enhance the encryption security. However, where as indicated above, a portion of the inputted code is not stored at the client, it is possible, but not preferred, that encryption be done using only the encryption key from the server.

Further, where the stored code length was increased by being run through a one-way function, the results of such operation could also be combined with the transmitted encryption key to produce the new encryption key of enhanced length. Alternatively, the saved portion of the original coded input along with the received encryption key and non-secret static or dynamic information of the type previously indicated could be run through a one-way function after the encryption key is received from the server, and the resulting encryption key of substantially enhanced length could be utilized in the manner previously described both for end-to-end encryption of data transmitted from and received by the client and to encrypt appropriate material the next time the client is locked.

During step 56, the decryption key transmitted from the server is used to decrypt encrypted files and directories at the client, including any files or directories transmitted from the server during step 52. When these steps have been completed, the client is unlocked and ready for use.

While not specifically indicated in FIG. 2, the server also stores an indication in an appropriate directory for the client, indicating that the client is unlocked, and where two or more users are authorized for a client, the user who is then authenticated for the client. Appropriate flags may also be stored at the server for the client and/or the user by a network administrator indicating resources on the network which the client and/or the user has authorization for. Thus, depending on the user's job, security level in the company and need to know, the user may be granted access to only certain files at server 12 or at server 16 or accessed to certain other clients on the network. As previously indicated, such control may be accomplished in a variety of ways known in the art, including, for example, routing all such requests through server 14, which requests are honored by the server or passed on to the appropriate other resource on the network only if the user has been properly authenticated and has authorization for such resource.

Figure 3:
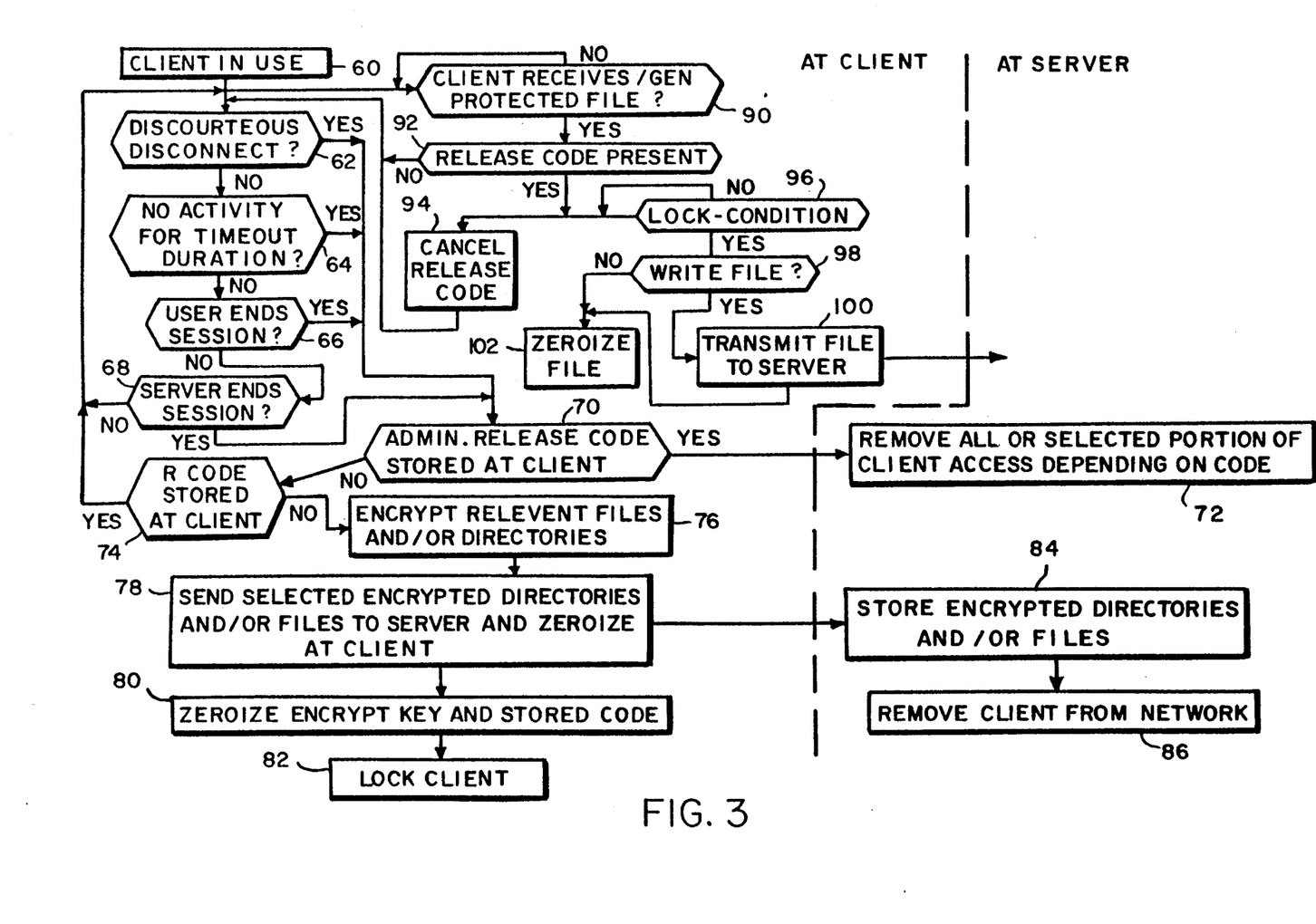
FIG. 3 is a flow diagram of the steps performed at the client and at the server when a client is to be locked.

FIG. 3 illustrates the sequence of operation which may occur in accordance with the teachings of this invention when a client is in use (step 60) and a condition occurs which may result in the locking of the client. In FIG. 3, four conditions which may result in locking of the client are illustrated; however, such conditions are by no means exhaustive, and other conditions may exist which, for a given network, would result in client locking.

In FIG. 3, when a client is in use, the client is monitored to determine if a discourteous disconnect occurs (step 62), if there is no activity at the terminal for a time out duration, for example ten minutes (step 64), whether the user enters an end of session indication (step 66) or whether the server ends a session (step 68). A discourteous disconnect would occur if the client were unplugged from the line, otherwise physically moved, or if some portion of the client, for example, its disk drive, were removed. It might also occur as a result of some other unauthorized activity of the user such as an attempt by the user to access files for which the user does not have authorization. Step 64 is included to assure that a client is not left unattended by the user for any substantial period of time without logging off. The time out period may be adjusted as appropriate for a given network, client or user. Step 66 would occur as the result of a standard log-off by the user and step 68 would occur under circumstances programmed into the server where a server may wish to shut down the network for some period of time or to lock the client for some reason.

If none of conditions 62-68 are detected, the operation proceeds in normal fashion. If one of these conditions is detected, the operation proceeds to step 70 to determine if an administrative release code is present at the client. An administrative release code may be provided automatically for a given client or user by the network administrator so that this code is permanently present at the client or is transferred to the client after a successful log-on, or may be provided by the server or by a network administrator in response to a user request. An administrative release code will permit the continued use of the client; but, depending on the code, will result in the removal of all or a selected portion of client access to the network, depending on the code. Depending on the code, there may also be some restrictions in access to or use of client files or other resources. Thus, if during step 70 it is determined that there is an administrative release code at the client, a message is sent by the client to the server that a log-off condition has occurred. This results during step 72 in the server storing appropriate codes in an appropriate directory for the client to remove or inhibit access by the client to all or a selected portion of the resources on the network depending on the code.

If during step 70 it is determined that an administrative release code is not present, the operation proceeds to step 74 to determine if a special release code, called an R code, is stored at the client. The R code would be stored in the same manner as the other release codes at the client, but differs from the other release codes in that it inhibits all locking of the terminal. Thus, if the R code is present, the client remains in use without any change, the same as if a locking or log-off condition had not occurred.

If a "no" output is obtained during step 74, then the client is to be locked and the operation proceeds to step 76 to encrypt all relevant files, tables and/or directories which are to be encrypted when the client is locked. This encryption is done using the encryption key which was generated during step 54 (FIG. 2) in one of the manners previously described.

During step 78, the next step in the operation, selected encrypted directories and/or files may be transmitted to the server and zeroized at the client. During step 80, the encryption key which was used for encryption at the client is zeroized as is any portion of the PIN information or other information stored during step 42 (FIG. 2). When these steps have been completed, the client is locked (step 82).

At server 12, the encrypted directories and/or files transmitted during step 78 are stored during step 84. During step 78, whether files and/or directories are transmitted or not, a message is sent to the server that the client is being locked. During step 86, in response to this message, the server makes appropriate entries in directories for the client to assure that the client will not have access to any resource on the network. While not specifically indicated in FIG. 3, and depending on the manner on which access control is provided on the network, server 12 may also send messages to server 16 and/or to other clients on the network advising that the given client 14 is locked and is, therefore, not entitled to access any network resource.

FIG. 3 also illustrates the situation where the client either receives or generates a protected file (i.e. a file which is not to be stored at an unattended client, even one with a release code). Thus, during step 90, a determination is made as to whether the client has such a protected file. If the client has such a protected file, a determination is made during step 92 as to whether a release code is present for the client. If a release code is not present, then the existence of such a protected file is not a problem since the file will at least by encrypted at the client when the terminal is locked. Alternatively, if this is a file which is generated by the client or is a write file which has been received from the server, this file would normally be one of the files which is transmitted to the server before being zeroized at the client. Preferably, the protected file would be designated to be transmitted and zeroized under any circumstances. In either event, no special handling is required.

However, if a release code is found to be present during step 92, then one of two things must be done to assure that such a file is adequately protected. One option is to proceed to step 94 to cancel the release code, or as a minimum to upgrade the release code so that the file will be encrypted or zeroized the next time a client lock condition occurs.

Alternatively, from step 92, the operation may proceed to step 96 to determine if a lock condition has occurred. This would be one of the conditions 62–68. If a lock condition has not occurred, nothing further happens until such condition occurs. When a lock condition does occur, the operation proceeds to step 98 to determine if the protected file is a write file. If the file is a write file, the operation proceeds to step 100 to transmit the write file to the server 12 where such file is stored. Either after the file has been transmitted if the file is a write file, or from step 98 if the file is not a write file, the operation proceeds to step 102 to zeroize the protected file. Thus, even if a release code is present at the client, the protected file does not remain at an unattended client.

While for the preferred embodiment, the functions shown in FIGS. 2 and 3 would be accomplished by suitable programming at the client and server, it is apparent that these functions could also be performed by use of special purpose circuitry or by firmware.

Thus, while the invention has been particularly shown and described above with reference to a preferred embodiment and a number of variations thereon, it is apparent that the foregoing and other variations in form and detail may be made by one skilled in the art without departing from the spirit and scope of the invention.

What is claimed is:

1. An integrated security system for a network having a server and at least one client comprising:
    means for normally locking each client to restrict in a selected way use of the client itself and use of the client in gaining access to the network;
    means at the client for receiving at least one coded input from a user;
    means at the client for transmitting to the server signals which are a representation of at least a selected portion of the coded input;
    means at the server for utilizing the received signal representation to authenticate the user, for retrieving unlock inputs for the user and, when the user has been authenticated, for sending to the client signals representative of the unlock inputs; and
    means at the client for utilizing the unlock input signals to unlock the client.

2. A system as claimed in claim 1 including means at the client for saving a selected portion of the coded input, said means for transmitting transmitting signals which are a representation of the remaining portion of the coded input.

3. A system as claimed in claim 2 wherein the coded input from the user includes the current value of a dynamically varying non-predicatable number generated by a device in the possession of the user;
    wherein signals indicative of a client ID are transmitted to the server with the representation signals; and
    wherein the means to authenticate at the server includes means for using the client ID signals to retrieve appropriate representation signals for the user, and means for matching the retrieved representation signals with the transmitted representation signals to authenticate the user.

4. A system as claimed in claim 3 wherein the user has a PIN which is inputted into the device by the user and combined in a selected way in the device in producing the non-predictable number inputted by the user.

5. A system as claimed in claim 3 wherein the user has an alpha numeric PIN (AN-PIN), wherein the coded input from the user includes the AN-PIN, wherein a selected portion of both the non-predictable number and the AN-PIN are saved at the client, and wherein remaining portions of the non predictable number and the AN-PIN are combined in a predetermined way to produce the representation signals transmitted to the server.

6. A system as claimed in claim 2 wherein, when the client is locked, at least selected material stored at the client is stored in encrypted form, and wherein the unlock inputs sent to the client include a decryption key for said selected material.

7. A system as claimed in claim 6 wherein the server includes means for transmitting an encryption key to the client after user authentication; and wherein the client includes means for utilizing the encryption key the next time the client is to be locked to encrypt said selected material.

8. A system as claimed in claim 7 wherein the means at the client for encrypting includes means for combining the transmitted encryption key from the server with at least a portion of the coded input saved at the client to product an encryption key for the selected material.

9. A system as claimed in claim 8 wherein the user has a device which generates a dynamically varying non predictable number which is unique to the user, the coded input from the user including the current non predictable number from the device.

10. A system as claimed in claim 9 wherein the device includes a user controlled means for generating a second non-predictable code for the user which may also form part of said coded input; and wherein the client includes means for combining the second non-predictable code with the transmitted encryption key to product a longer encryption key for the selected material.

11. A system as claimed in claim 7 including means for running the encryption key, at least a portion of the stored coded input and selected non-secret data through a one-way function to obtain a longer encryption key.

12. A system as claimed in claim 2 including means for passing all of the coded input from the user through a one-way function, the transmitted representation signals including at least a sufficient portion of the output from the one-way function to assure that all of the coded input is correct when authentication occurs at the server.

13. A system as claimed in claim 1 including means for utilizing selected data, including at least a portion of the coded input from the user, to generate an encryption key, means for utilizing at least a portion of said encryption key for end-to end encryption of communications with the client, and means for utilizing at least a portion of the encryption key to encrypt at least selected material at the client when the client is locked.

14. A system as claimed in claim 13 wherein the portion of the encryption key utilized for end-to-end encryption and the portion utilized for encryption on client locking are not identical.

15. A system as claim in claim 1 including means at the client for running at least a portion of the coded input and selected non-secret data through a one-way function to obtain a value having more characters than the coded input, which value may be utilized as all or a portion of an encryption key.

16. A system as claimed in claim 1 wherein selected material required to operate a client is zeroized at the client when the client is locked and is transmitted in encrypted form to be stored at the server; and wherein the server includes means operative when the user has been authenticated for retransmitting the stored encrypted material to the client along with a decryption key.

17. A system as claimed in claim 1 including means responsive to selected conditions at the client for locking the client.

18. A system as claimed in claim 17 wherein one of said selected conditions is a discourteous disconnect of the client.

19. A system as claimed in claim 17 wherein one of said selected conditions is an end-of-session input from the user.

20. A system as claimed in claim 17 wherein one of said selected conditions is there being no activity by the user at the client for a selected time interval.

21. A system as claimed in claim 17 including means for storing a release code at the client, and means responsive to the release code for inhibiting the full locking of the client in response to a selected condition.

22. A system as claimed in claim 21 wherein said means for inhibiting permits the locking of the client from access to the network, but permits at least the selected continued use of the client.

23. A system as claimed in claim 21 wherein the client may generate or receive selected protected files, each of which contains a protection flag, and means responsive to the detection of a protection flag for preventing use of the protected file at the client after one of said selected conditions has occurred.

24. A system as claimed in claim 23 wherein said means for preventing use of the protected file includes means for removing or reducing the release code so that the client cannot access the file after a selected condition occurs.

25. A system as claimed in claim 23 wherein said means for preventing includes means for encrypting or zeroizing the protected file at the client when a selected condition occurs.

26. A system as claimed in claim 25 including means for indicating if the protected file may be written into at the client, and including means responsive to an indication that a protected file may be written into for transmitting the protected file to the server prior to zeroizing the file.

27. A method for providing integrated security on a network having a server and at least one client comprising the steps of:

normally locking each client to restrict in a selected way use of the client itself and use of the client in gaining access to the network;

receiving at the client at least one coded input from a user;

transmitting signals which are a representation of at least a selected portion of the coded input from the client to the server;

utilizing the received representation signals at the server to authenticate the user, to retrieve unlock inputs for the user and, when the user has been authenticated, to send the unlock inputs to the client; and utilizing the unlock inputs at the client to unlock the client.

28. A method as claimed in claim 27 including the step performed at the client of saving a selected portion of the coded input, the representation signals transmuted during the transmitting step being of the remaining portion of the coded input.

29. A method as claimed in claim 28 wherein the coded input from the user includes the current value of a dynamically varying non-predictable number generated by a device in the possession of the user;

wherein signals indicative of a client ID are transmitted to the server with the representation signals; and wherein the authenticating step at the server includes the steps of using the client ID signals to retrieve the appropriate representation signals for the user, and matching the retrieved representation signals with the transmitted representation signals to authenticate the user.

30. A method as claimed in claim 29 wherein the user has a PIN which is inputted into the device by the user and combined in a selected way in the device in producing the non-predictable number inputted by the user.

31. A method as claimed in claim 29 wherein the user has an alphanumeric PIN (AN-PIN), wherein the coded input from the user includes the AN-PIN, wherein a selected portion of both the non-predictable number and the AN-PIN are saved at the client, and wherein remaining portions of the non-predictable number and the AN-PIN are combined in a predetermined way to product the representation transmitted to the server.

32. A method as claimed in claim 28 wherein, when the client is locked, at least selected material stored at the client is stored in encrypted form, and wherein the unlock inputs sent to the client include a decryption key for said selected material.

33. A method as claimed in claim 32 including the steps of transmitting an encryption key from the server to the client after user authentication, and utilizing the encryption key at the client the next time the client is to be locked to encrypt said selected material.

34. A method as claimed in claim 33 wherein the encrypting step at the client includes the step of combining the transmitted encryption key from the server with at least a portion of the coded input saved at the client to produce an encryption key for the selected material.

35. A method as claimed in claim 34 wherein the user has a device which generates a dynamically varying non-predictable number which is unique to the user, the coded input from the user including the current non-predictable number from the device.

36. A method as claimed in claim 35 wherein the device includes a user controlled means for generating a second non-predictable code for the user which may also form part of said coded input; and including the step performed at the client of combining the second non-predictable code with the transmitted encryption key to produce a longer encryption key for the selected material.

37. A method as claimed in claim 33 including the step of running the encryption key, at least a portion of the stored coded input and selected non-secret data through a one-way function to obtain a longer encryption key.

38. A method as claimed in claim 28 including the step of passing all of the coded input from the user through a one-way function, the transmitted representation including at least a sufficient portion of the output from the one-way function to assure that all of the coded input is correct when authentication occurs at the server.

39. A method as claimed in claim 27 including the steps of utilizing selected data, including at least a portion of the coded input from the user, to generate an encryption key, utilizing at least a portion of said encryption key for end-to-end encryption of communications with the client, and utilizing at least a portion of the encryption key to encrypt at least selected material at the client when the client is locked.

40. A method as claimed in claim 39 wherein the portion of the encryption key utilized for end-to-end encryption and the portion utilized for encryption on client locking are not identical.

41. A method as claimed in claim 27 including the step performed at the client of running at least a portion of the coded input and selected non-secret data through a one-way function to obtain a value having more characters than the coded input, which value may be utilized as all or a portion of an encryption key.

42. A method as claimed in claim 27 wherein selected material required to operate a client is zeroized at the client when the client is locked and is transmitted in encrypted form to be stored at the server; and including the step performed at the server when the user has been authenticated for retransmitting the stored encrypted material to the client along with a decryption key.

43. A method as claimed in claim 27 including the step of locking the client in response to selected conditions at the client.

44. A method as claimed in claim 43 wherein one of said selected conditions is a discourteous disconnect of the client.

45. A method as claimed in claim 43 wherein one of said selected conditions is an end-of-session input from the user.

46. A method as claimed in claim 43 wherein one of said selected conditions is there being no activity by the user at the client for a selected time interval.

47. A method as claimed in claim 43 including the steps of storing a release code at the client, and inhibiting the full locking of the client in response to a selected condition when a release code is present.

48. A method as claimed in claim 47 wherein said inhibiting step permits the locking of the client from access to the network, while permitting at least the selected continued use of the client.

49. A method as claimed in claim 47 wherein the client may generate or receive selected protected files, each of which contains a protection flag, and including the step performed in response to the detection of the protection flag of preventing use of the protected file at the client after one of said selected conditions has occurred.

50. A method as claimed in claim 49 wherein the step of preventing use of the protected file includes the step of removing or reducing the release code so that the client cannot access the file after a selected condition occurs.

51. A method as claimed in claim 49 wherein said step of preventing includes the step of encrypting or zeroizing the protected file at the client when a selected condition occurs.

52. A method as claimed in claim 51 including the steps of indicating if the protected file may be written into at the client, and retransmitting the protected file to the server prior to zeroizing the file in response to an indication that a protected file may be written into.

* * * * *